June 10, 1941.                T. B. DOE ET AL                2,244,830
                              POWER TRANSMISSION
                         Filed March 10, 1936          4 Sheets-Sheet 1
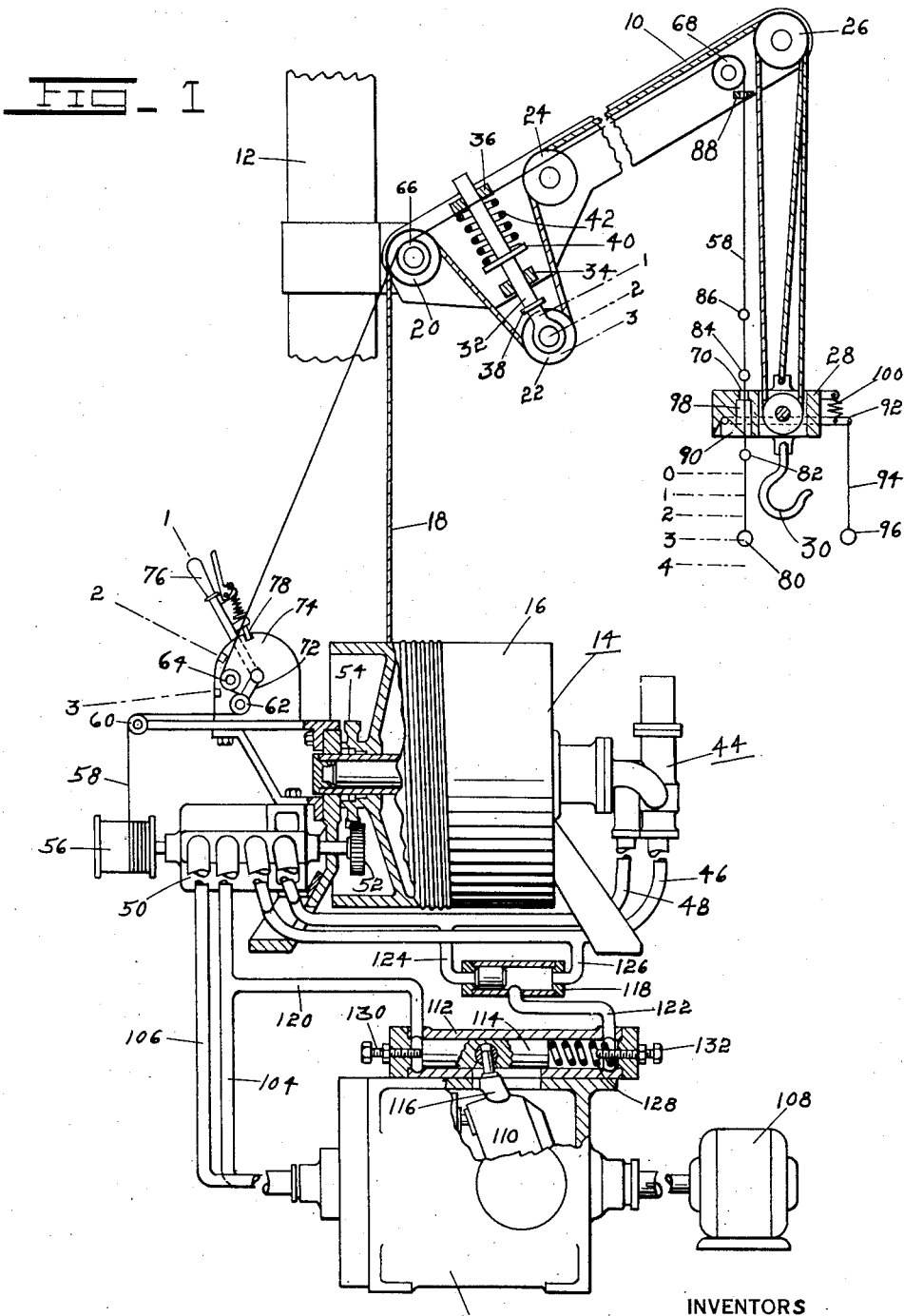
INVENTORS
Thomas B. Doe
Edwin L. Rose
BY
Ralph L. Tweedale
ATTORNEY

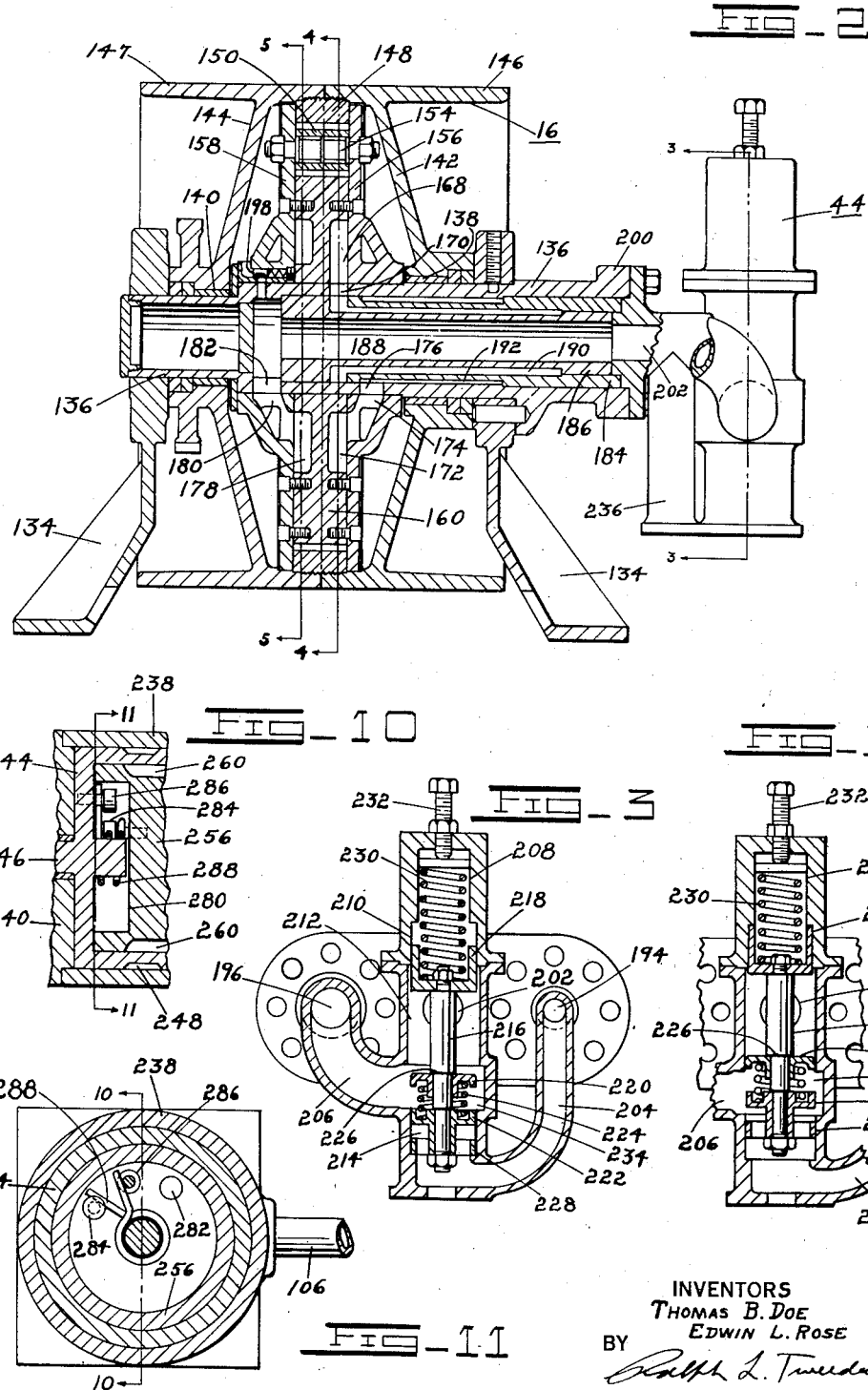

June 10, 1941. T. B. DOE ET AL 2,244,830
POWER TRANSMISSION
Filed March 10, 1936   4 Sheets-Sheet 3
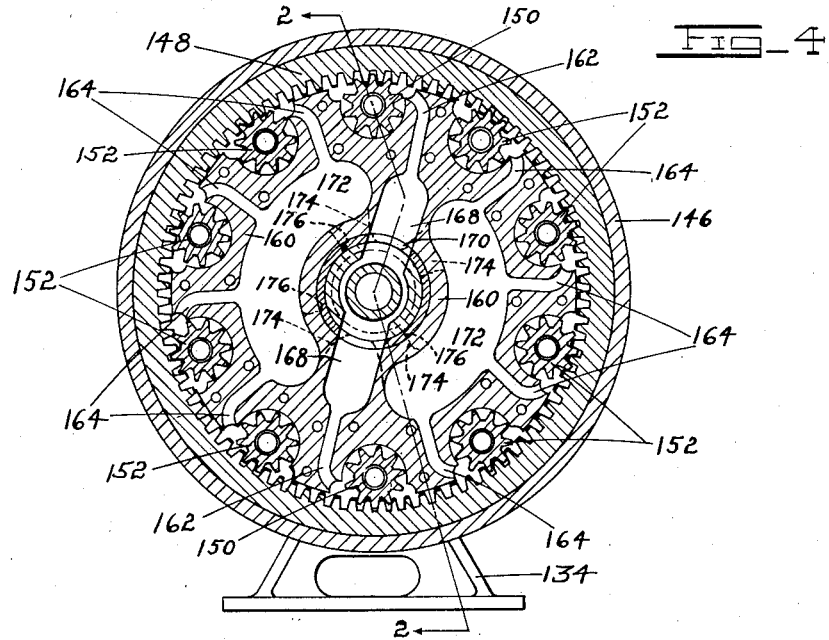
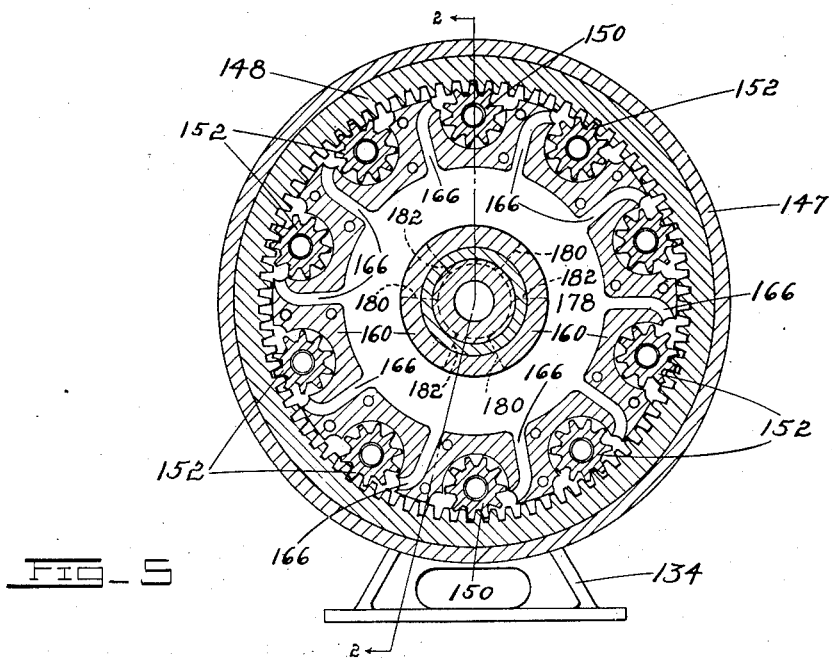
INVENTORS
THOMAS B. DOE
EDWIN L. ROSE
BY
Ralph L. Tweedale
ATTORNEY

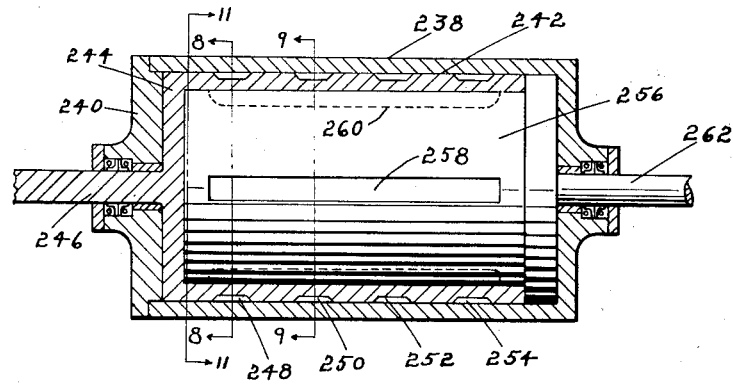
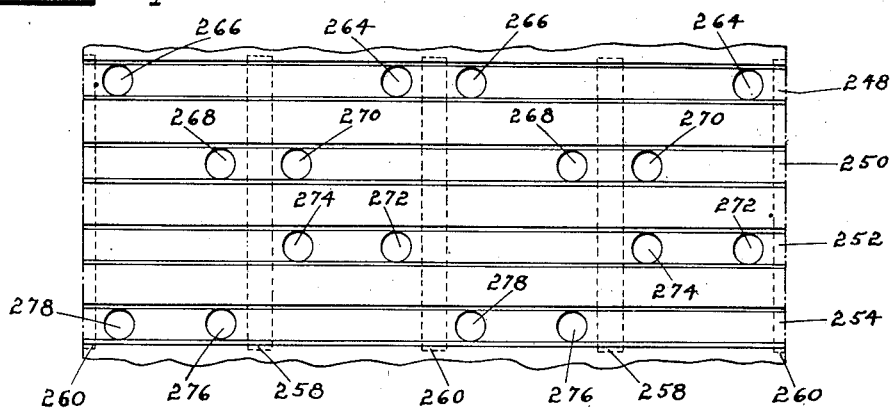
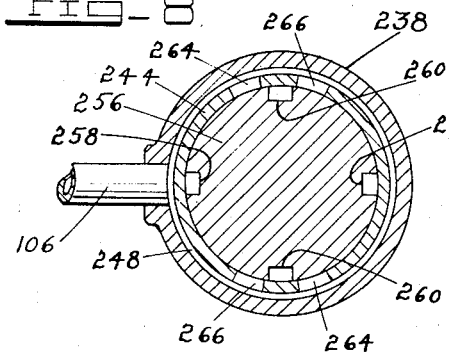
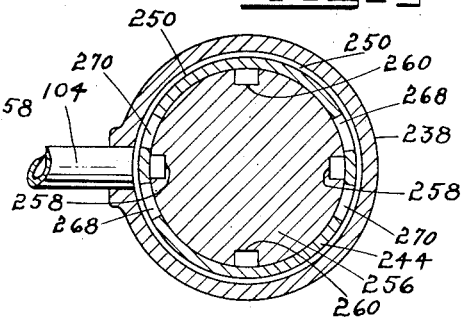

Patented June 10, 1941

2,244,830

UNITED STATES PATENT OFFICE 2,244,830

POWER TRANSMISSION

Thomas B. Doe, New York, N. Y., and Edwin L. Rose, Waterbury, Conn., assignors to The Waterbury Tool Company, Waterbury, Conn., a corporation of Connecticut Application March 10, 1936, Serial No. 68,070

28 Claims. (Cl. 254—172)

This invention relates to power transmissions and more particularly to a novel power transmission device and control therefor particularly adapted to hoisting an object while relative movement between the object and the hoisting device is occurring. A device of this character is useful, for example, on ship board for the purpose of lifting floating objects such as boats, airplanes, etc., from a rough sea. The invention is shown and described as adapted for this use, although it will be understood that the invention may be used for other purposes.

In lifting floating objects from rough seas, particularly objects of a comparatively fragile character, such as a seaplane, it is necessary to insure that the means, usually a cable, which connects the object to the hoist is maintained taut at all times while the object is moved up and down relative to the hoist by the action of the waves. Unless this result is insured at all times, it is possible and frequently occurs that when the hoist is operated to lift the object out of the water, a sudden jerk is given to the object and the connecting means, which may be of sufficient magnitude to rupture the connecting means or to damage the object by pulling out the ring, or other facilities for attachment to the connecting means. Devices heretofore proposed for solving this problem, have been so constructed as to require a difficult manual operation of the controls, when changing from constant tension to hoisting, if dangerous jerks on the object are to be avoided. Furthermore, such devices under certain conditions of operation have been known to permit slack and consequent jerking to occur.

It is an object of the present invention to provide a power transmission device for driving a hoist and including control devices for preventing a sudden jerk upon the object being hoisted under any condition of operation.

A further object is to provide a control system for a device of this character by which the operation of changing over from a condition at which a predetermined tension is maintained in the hoisting connection to the condition of positive hoisting may be made without jerks by an operator positioned at the object to be lifted, who is in a better position to determine the proper moment to begin hoisting than an operator located upon the deck of the ship for example.

A further object is to provide a device of this character with a control operable through a pilot cable which may be run adjacent to the lifting cable and by means of which an operator located at the object to be lifted may positively and easily control the movement of the hook toward the object to be lifted, irrespective of the relative movement between the object to be lifted and the hoisting device.

A further object is to provide a control for a device of the character described providing means for taking up slack which might occur due to wave action after hoisting is started, that is to say, to provide a control which, during hoisting, has no upper limit to the tension which may be maintained on the hoisting connection but maintains a lower limit of tension thereon.

It is also an object to provide such a control means which operates in response to the loading and unloading of the hoisting connection by the full weight of the object being hoisted and does not require manual operation.

Another object is to provide a device of the character described wherein a fluid power transmission is utilized for driving the hoist, which transmission includes a fluid motor of variable displacement together with control means for varying the displacement of the motor in response to changes in tension on the connecting means.

A further object is to provide a device of the character described including a fluid power transmission and a control device therefor incorporating a follow-up valve by which movement and position of the fluid motor may be positively controlled.

It is also an object to provide a device of the character described including a fluid power transmission having a variable displacement pump and a valve for controlling the flow of fluid from the pump to the motor, wherein the displacement of the pump is controlled in accordance with the pressure drop across the valve.

Another object is to provide means in addition to the normal hoist control, for permitting limited relative motion between the object to be lifted and the hoist and which are particularly useful in compensation for the effect of small wave actions which are superimposed upon the predominant large waves or swells.

Further objects and advantages of the present invention will be apparent from the following description, reference being had to the accompanying drawings wherein a preferred form of the present invention is clearly shown.

In the drawings:

Fig. 1 is a diagrammatic view of a hoisting device embodying the present invention.

Fig. 2 is a cross section on lines 2—2 of Figs.

4 and 5 showing a combined winch and hydraulic motor forming part of the device illustrated in Fig. 1.

Fig. 3 is a cross section on line 3—3 of Fig. 2 showing a valve used in connection with the hydraulic motor.

Fig. 4 is a cross section on line 4—4 of Fig. 2.

Fig. 5 is a cross section on line 5—5 of Fig. 2.

Fig. 6 is a longitudinal sectional view of a follow-up valve included in the mechanism shown in Fig. 1.

Fig. 7 is a developed view of the cylindrical surface of one member of the valve shown in Fig. 6.

Fig. 8 is a cross section on line 8—8 of Fig. 6.

Fig. 9 is a cross section on line 9—9 of Fig. 6.

Fig. 10 is a cross section on line 10—10 of Fig 11 showing a detail of the follow-up valve.

Fig. 11 is a cross section on line 11—11 of Fig. 10.

Fig. 12 is a fragmentary cross section corresponding to Fig. 3 showing the parts in a different position.

Referring now to Fig. 1, there is illustrated a hoist comprising a crane boom 10 pivotally attached to a mast 12 of a ship. A winch 14 is suitably mounted on the deck of the ship and has a drum 16 over which is wound a cable 18 forming part of a connecting means between the hoist and the object to be lifted. Cable 18 is threaded over pulleys 20, 22, 24 and 26 and through a pulley block 28 to which is attached a hook or other load attaching means 30. The pulley 22 and the bight of the cable formed by the pulleys 20, 22 and 24 forms a yielding, lost-motion device between the hook 30 and the drum 16, the pulley 22 being for this purpose carried by a yoke 32 slidable in brackets 34 and 36 mounted on the boom 10. Yoke 32 carries a stop collar 38 for engagement with the bracket 34 on one side and a collar 40 for limiting the movement of the yoke in the opposite direction and for also forming an abutment for a spring 42, the other end of which abuts against the bracket 36. The pulley 22 is movable between three positions indicated as 1, 2 and 3.

The drum 16 includes a hydraulic motor incorporated in the interior of the drum by which the drum may be rotated in either direction. This motor, which will be described in detail hereafter, is of variable displacement, and a pressure responsive valve 44 is provided at one end of the winch for controlling the effective displacement of the winch operating motor. Conduits 46 and 48 form supply and return conduits between the valve 44 and a follow-up valve 50 mounted at the opposite side of the winch. Follow-up valve 50 comprises two movable members one of which is driven from the drum 16 through gears 52 and 54 while the other of which is operated through a pilot drum 56. The drum 56 has wound thereon a pilot cable 58 leading over pulleys 60, 62, 64, 66 and 68 to a guide hole 70 in the pulley block 28. The pulley 62 is mounted on an arm 72 which is pivotally mounted in a bracket 74 and may be operated by means of a hand lever 76 to increase or decrease the length of the bight formed by the pulleys 60, 62, and 64. Hand lever 76 is movable between three positions numbered 1, 2, and 3 respectively, in any of which it may be latched by a detent 78.

The depending end of the pilot cable 58 carries a ring 80 by which the cable 58 may be operated and is also provided with limit stops 82, 84 and 86. Stop 86 is engageable with a bracket 88 mounted on the boom 10 for limiting the upward travel of the cable 58 relative to the boom 10. The stop 84 limits the downward travel of cable 58 relative to pulley block 28 while the stop 82 limits the upward travel of cable 58 relative to the block 28. A latch 90 is pivotally mounted in the pulley block 28 in a manner to limit the upward travel of the stop 82 to the bottom of the pulley block 28 when the latch is in the position illustrated. A lever 92 is connected to the latch 90 for operation by a cable 94 and ring 96 to release the latch 90 and permit the stop 82 to travel upwardly into a recess 98 formed adjacent the guide hole 70. A spring 100 normally retains levers 92 and latch 90 in the position illustrated.

The follow-up valve 50 is connected to a variable displacement pump 102 by means of supply and return conduits 104 and 106, the pump 102 being operated by a suitable prime mover, such as a substantially constant speed electric motor 108. The pump 102 may be of any suitable construction and is illustrated as of the well-known "Waterbury" type which includes a tilting box 110 by means of which the stroke and consequently the displacement of the pump may be varied. A stroke regulating cylinder 112 is mounted adjacent the top of the pump and encloses a piston 114 having a pivotal connection with an operating arm 116 mounted on the tilting box 110. The opposite ends of the cylinder 112 are connected with supply conduit 104 and with a shuttle valve 118 by conduits 120 and 122 respectively. The shuttle valve 118 is connected with each of conduits 46 and 48 by branches 124 and 126 so that the shuttle valve provides communication between the conduit 122 and whichever of the conduits 46 or 48 is, at any moment, under the higher pressure. A spring 128 urges the piston 114 to the position of full stroke. Adjustable stops 130 and 132 are provided for limiting the maximum and minimum stroke of the pump 102.

Referring now to Figs. 2, 4, and 5, the internal construction of the fluid motor is there illustrated. The winch 14 includes a pair of pedestals 134 upon which is rigidly mounted a stationary central tubular supporting member 136. The drum 16 is rotatably mounted on the tubular support 136 by means of bearings 138 and 140. The drum 16 is made in two halves each including a a dished imperforate web 142, and 144 connecting the rims 146 and 147 with the bearings 138 and 140. The two halves of the drum are rigidly secured by threads to an internal ring gear 148. Meshing with the ring gear 148 is a set of pinions 150 and 152, (Fig. 4) each of which is journalled upon a stationary trunnion 154. The sides of the ring gear 148 and the ends of the pinions 150 and 152 are enclosed by a pair of stationary plates 156 and 158 which are rigidly secured to the supporting member 136. The space between the plates 156 and 158 which is not occupied by the ring gear 148 or the pinions 150 and 152 is occupied by a filler block 160 to which the plates 156 and 158 are rigidly bolted.

The block 160 is formed with a plurality of fluid passages communicating with the meshing points of the various pinions with the ring gear to provide suitable fluid inlet and outlet connections. For this purpose passages 162 (Fig. 4) communicate with the pinions 150 on one side of their meshing points with gear 148, while passages 164 communicate with the pinions 152 at the same side of their meshing points with the gear 148. Passages 166 (Fig. 5) communicate with each of the pinions 150 and 152 at the opposite sides of their meshing points with gear 148. Passages 162 communicate by means of passages 168 with the interior of the supporting member 136 through holes 170 formed therethrough. Passages 164 communicate with chambers 172 each of which in turn communicates with the interior of the supporting member 136 by passages 174 formed in the plates 156 and passages 176 formed in the supporting member 136. The passages 174 and 176 are shown by dotted lines in Fig. 4 for sake of clearness, although they would not appear in a true reproduction of the section which Fig. 4 represents. The passages 166 communicate with a chamber 178 which in turn communicates by means of passages 180 formed in the plate 158 and holes 182 in the supporting member 136 with the interior of the latter. Within the hollow interior of the supporting member 136 there are mounted two fluid dividing sleeves 184 and 186 which form three concentric fluid passages 188, 190 and 192. The passage 188 communicates with passages 166 through chamber 178 and passages 180 and 182. The passage 190 communicates with passages 162 through passages 168 and 170 while the passage 192 communicates with passages 164 through chamber 172 and passages 174 and 176. The right-hand end of the supporting member 136 as viewed in Fig. 2 is extended horizontally on both sides of the drum axis to form fluid passages 194 and 196 (see Fig. 3), which communicate respectively with the passages 190 and 192. The passage 188 extends to the right-hand end of the member 136 in alignment with the axis thereof. For the purpose of relieving pressures which may develop between the plates 156 and 158 and the webs 142 and 144 respectively due to leakage, a low pressure relief valve 198 emptying into passage 188 is provided.

The valve 44 is mounted at the right-hand end of the supporting member 136, being secured thereto by a flange connection 200 by which the passages 188, 194 and 196 communicate with passages 202, 204 and 206 respectively of valve 44. Valve 44 comprises a vertical central bore 208 having portions 210, 212, and 214 of different respective diameters. The portion 210 is of the smallest diameter and portion 212 the largest while the portion 214 is of intermediate diameter. Freely slidable within the bore 208 is a valve member generally designed at 216 carrying pistons 218, 220 and 222 fitting the bores 210, 212, and 214 respectively. The piston 220 is freely slidable on the valve member 216, a spring 224 normally holding the piston 220 against a shoulder 226 formed on the member 216. The piston 222 carries a guide spider 228 for guiding the lower end of the member 216 when the piston 222 is out of the bore 214.

A spring 230 is mounted in the upper end of the bore 208 to urge the valve member 216 downwardly and is adjustable by means of an adjusting screw 232. The passage 206 communicates with the bore 208 at an enlarged chamber 234 between the portions 212 and 214. The passage 204 communicates with the bore 208 at the lower end thereof below the portion 214 while the passage 202 communicates with the bore 208 at the portion 212. The passage 202 also has a branch 236 (Fig. 2) by which the conduit 48 communicates therewith while the conduit 46 communicates with the lower end of the bore 208 at the point where the passage 204 connects therewith.

The operation of the parts shown in Figs. 2, 3, 4 and 5 is such that if fluid under pressure be supplied through the conduit 46 to the lower end of the bore 208 with the parts in the position illustrated in Fig. 3, a passage is constantly open to the two pinions 150 through passages 204, 194, 190, 170, 168 and 162. So long as the pressure existing in conduit 46 and acting on piston 222 is insufficient to overcome the force of the spring 230 holding the parts in the position shown in Fig. 3, the entire quantity of fluid supplied through the conduit 46 flows to the two pinions 150 and causes them and the ring gear 148 to revolve clockwise in Fig. 4. The pinions deliver the fluid supplied to them to the conduits 166 from which it flows through chamber 178, and passages 180, 182, 188, 202, and 236 to the return conduit 48. The drum 16 is thus caused to revolve clockwise in Fig. 4.

During such movement the pinions 152 and ring gear 148 act as gear pumps withdrawing fluid from the passages 164 and delivering it through passages 166, chamber 178, passages 180, 182, 188, 202, portion 212 of bore 208, passages 206, 196, 192, 176 and 174, to chamber 172 and passages 164. This circuit is of substantially negligible resistance so that the eight pinions 152 are by-passed and ineffective so far as operation of the drum 16 is concerned. For a given quantity of fluid supplied through the conduit 46, the speed of operation of the drum 16 under these conditions is therefore comparatively high since the entire quantity of fluid supplied to the hydraulic motor is operative upon only two pinions thereof and the effective displacement of the motor is consequently small. While the hoist may be operated at high speed under these conditions, the load which it may handle is comparatively limited. As soon as the load increases to a predetermined value which is determined by the area of the piston 222 and the force exerted by the spring 230, the piston 222 lifts the entire valve assembly to open communication between conduit 46 and passage 206. Since this action takes place while the hoist is operating upon two pinions, the quantity of fluid returning from all ten pinions through the passage 202 is greater than the amount withdrawn from conduit 48 by the pump 102. The excess quantity is permitted to by-pass from portion 212 of the bore 208 to the passage 206 by pushing the piston 220 downwardly on stem 216 against the spring 224 until such time as the entire quantity of fluid returning from the ten pinions is taken in by the pump through the conduit 48.

At this time the piston 220 moves completely into the portion 212 of the bore 208, thus effectively sealing the high pressure fluid within chamber 234 from the low pressure fluid in portion 212 of bore 208. Under this condition the parts lie in the position illustrated in Fig. 12 and fluid is distributed to all ten of the pinions 150 and 152. The path of the fluid to and from the pinions 150 is the same as that previously described. The path of the fluid to and from the pinions 152 is the same as the by-pass path previously described except that fluid is supplied to the passage 206 from the chamber 234 of the bore 208 and fluid returning to the conduit 262 goes to the return conduit 48 through the branch 236. Whenever the pressure in conduit 46 is reduced to a predetermined value lower than the value at which the valve 216 lifted, the valve falls again to the position illustrated in Fig. 3. The difference in the points at which the valve lifts and falls is due to the difference in area between the piston 222 and 220. The piston areas may be so chosen with regard to the displacement ratio of the motor, in this case one to five, that the difference in cable tension between the opening and closing point may be anything desired. For smoothness in change-over it is desirable to make the areas such that the cable tension at opening is lower than at closing, thus giving a range of cable tension in which the eight pinions operate on a fluid pressure which is reduced by throttling at the valve 44. Thus, if the areas are such that the valve 216 rises at three times the pressure at which it falls, with a one to five displacement ratio, the cable tension required to maintain the valve fully open will be one and two thirds the tension required to crack the valve open.

Referring now to Figs. 6 through 11, inclusive, there is illustrated the follow-up valve indicated at 50 in Fig. 1. This valve comprises a housing 238 having an end cap 240 which together form a cylindrical chamber 242. Within the chamber 242 there is rotatably mounted a tubular valve member 244 having an operating stem 246 to which it attached the pilot drum 56. The valve member 244 is formed with four circumferential grooves 248, 250, 252, and 254 communicating with the conduits 106, 104, 46 and 48 respectively. Within the hollow interior of the valve member 244 there is mounted a second, cylindrical, valve member 256 having two pairs of diametrically opposite longitudinal grooves 258 and 260. The valve 256 has a stem 262 upon which is mounted the gear 52 through which the member 256 is rotated by the drum 16. The ratio of gears 52 and 54 and the size of the pilot drum 56 are so correlated with the number of cable falls between the boom 10 and the block 28 and the diameter of the drum 16 that the valve members 244 and 256 move together when the ring 80 and hook 30 move together.

The valve member 244 is formed with a plurality of holes communicating between the various grooves 248, 250, 252, and 254 and the interior bore of the member 244. The lay-out of these holes is illustrated in Fig. 7 as a development of the outer cylindrical surface of the valve member 244. These holes are arranged in diametrically opposite pairs in order to balance the valve hydraulically. Thus, holes 264 communicate between the groove 248 and one edge of the grooves 260. Holes 266 communicate between groove 248 and the opposite edge of the grooves 260. Holes 268 communicate between groove 250 and one edge of the grooves 258. Holes 270 communicate between groove 250 and the opposite edge of the grooves 258. Holes 272 communicate between groove 252 and one edge of grooves 260. Holes 274 communicate between groove 252 and the opposite edge of the grooves 258. Holes 276 communicate between the groove 254 and one edge of the grooves 258 while holes 278 communicate between groove 254 and the opposite edge of grooves 260. The spacing between the edges of the grooves and the adjacent edges of the holes is shown exaggerated in the drawings and may be reduced to a very small value, or if desired, the grooves may be given a slight overlap with the edges of the adjacent holes when in the neutral position illustrated.

The amount of relative motion between the valve members 244 and 256 is limited by the mechanism illustrated in Figs. 10 and 11. Thus the valve member 256 is provided with an interior bore 280 within which a pair of stop pins 282 and 284 are secured to the member 256. A stop pin 286 is mounted on the member 244 to limit the relative movement of the valve members to the amount sufficient to fully open the grooves in the member 256 with either set of holes in the member 244. A spring 288 urges the member 244 clockwise in Fig. 11 and is sufficiently strong to quickly take up the cable 58 by reeling it on drum 56 whenever the end of the cable 58 is moved upwardly.

In operation of the follow-up valve when the parts are in the position illustrated in Figs. 6 to 11, both the supply and return conduits 104 and 106 are cut off from the conduits 46 and 48. If the member 244 is turned counter-clockwise in Fig. 8, such as would occur with the end of the cable 58 moved upwardly permitting the spring 288 to wind cable on the drum 56, holes 266 open to the grooves 260 and holes 270 open to the grooves 258. The grooves 258 and 260 are thereby connected to the pressure conduit 104 and return conduit 106 respectively. Concurrently the holes 274 open to grooves 258 and holes 278 open to the grooves 260. The grooves 258 and 260 are thereby also connected to the conduits 46 and 48 respectively. Fluid is thus permitted to pass from the pressure line 104 to the conduit 46 and to return from the conduit 48 to the return line 106. The amount of opening is dependent on the amount of relative movement between the stems 246 and 262.

As soon as the follow-up valve begins to pass fluid to the hoist motor, the drum begins to turn and through the gears 52 and 54 moves the valve member 256 in the same direction which the member 244 moved to open the valve. It will thus be seen that the drum 16 will be caused to follow the movements of the cable drum 56 and that as fast as the drum 56 is turned in the direction to wind cable thereon, the valve is opened to operate the motor in proportion to the very slight lag of the motor movements behind the movements of the pilot drum 56. As soon as the pilot drum 56 is stopped, a small continued movement of the motor moves the valve member 256 to close the valve. In the opposite direction of movement, the action is identical to that previously described except that the grooves 258 and 260 are placed in communication with the other set of holes in the valve member 244 and thus connect the motor for rotation in the opposite direction.

In operation of the device as a whole, the motor 108 is placed in operation and the block 28 is normally completely raised to the boom, the spring take-up in the follow-up valve 50 maintaining the cable 58 with its stop 86 abutting the bracket 88.

When it is desired to lift a seaplane floating alongside the ship (the ship and the plane being either traveling through the water at the same rate or both standing still except for wave movements), a light throwing line is attached to the ring 80 and thrown overboard to the pilot of the airplane. The control lever 76 should at this time be latched in position number 1. As soon as the operator aboard the airplane begins pulling the throwing line to pull the cable 58 downwardly, the pilot drum 56 is rotated in a direction to cause the drum 16 to unreel the main cable 18. It will be seen that the hook 30 under these conditions will follow the movements of the cable 58 relative to the operator aboard the airplane, even though the movements imparted to the plane and to the boom 10 due to the waves may at times produce a resultant movement on the cable 58 relative to the boom 10 in the opposite direction to the movement of the cable 58 relative to the operator. Thus, if the operator were pulling the cable 58 downwardly at a given speed and a wave were moving the plane upwardly at double that speed, the resultant movement of the cable 58 relative to the boom 10 is upward at half the speed of the upward movement of the plane. Since the hook 30 follows the movements of cable 58 relative to the boom 10, the hook will move upwardly at half the plane's upward speed and the movement of the hook toward the operator on the plane will then be downwardly at the same speed at which the cable 58 is being pulled toward the plane.

The operator is thus able to easily bring the hook downwardly toward the plane as fast as he wishes until it is below the ring or other attaching means by which the plane is to be lifted. The operator then lets the cable 58 move upwardly relative to the plane to engage the hook with the ring, the upward movement on the cable 58 being limited by the limit stop 82 engaging the latch 90. As soon as the hook engages the ring or is so close to engagement as to make its engagement certain, the operator may preferably completely release the cable 58.

During these operations the lost-motion pulley 22 was fully extended in position number 3 due to the absence of weight on the hook 30. As soon as the weight of the plane begins to come on to the hook 30, the pulley 22 is drawn upwardly into substantially position number 2. In so moving, relative movement is caused between the drums 56 and 16, due to the fact that the cable 58 is not threaded over the pulley 22 and that the continued winding in of the cable 18 instead of moving the hook 30 upwardly, shortens the bight of cable around pulley 22, thus causing the drum 16 to move ahead of the drum 56 and so close the follow-up valve 50. Thus, as soon as a predetermined tension is reached on the cable 18, the pulley 22 is brought into position number 2 and drum 16 is brought to rest by the concurrent closing of the follow-up valve 50. In a rough sea the pulley 22 will thereafter be constantly moving back and forth in the vicinity of position number 2 causing relative movement between the drums 56 and 16 sufficient to make the hook 30 follow the wave movements and maintain a substantially constant maximum tension on the cable 18. Likewise, it will be noted that the lost-motion device associated with pulley 22 acts, in addition to its function of controlling valve 50, to take up or pay out small amounts of cable without lag of any kind. This is particularly useful in compensating for small movements of the plane relative to the ship such as are caused by small waves which may be superimposed on the larger "swells." It is preferred to proportion the travel of pulley 22, the rate and length of spring 42 and the travel of valve 50 so that the pulley 22 can take up or pay out the largest amount of cable ever required during the small interval required for the speed of drum 16 to catch up with the speed of drum 56.

When it is desired to lift the plane from the water, the ring 96 is pulled downwardly tripping the latch 90 and permitting the stop 82 to move upwardly two steps to zero position, or the distance equivalent to that necessary to move from position number 4 to position number 2. The drum 56 is thereby moved relative to the drum 16 in the direction causing the drum 16 to wind in the cable 18, the pulley 22 simultaneously moving upward under the full weight of the plane until the stop 38 abuts the bracket 34.

As soon as the full weight of the plane comes on the hoist, the pressure in line 46 rises to a point sufficient to raise the valve 216 and shift the connections in the motor so that all ten pinions are operative. The plane is thus raised at a slower constant speed and may be stopped when it has been hoisted to sufficient height by moving the lever 76 to position number 2. It may also be stopped by the operator aboard the plane by pulling down the ring 80 to position number 1. Movement of the lever 76 to position number 3 causes the drum 16 to operate in the opposite direction lowering the plane on to the deck of the ship. The boom 10 having been swung inwardly, the plane comes to rest on deck and the hoist stops as soon as the tension is relieved to the value which is maintained while the plane floats alongside the ship. The hook may be released by the operator on the plane operating the pilot cable 58 to further lower the hook 30.

In order to more clearly understand the conditions of operation, the following table illustrates the effects produced by the three controls 80, 22 and 76 under various conditions. If the indicated positions of these parts be considered as numerical values, then the position of the control 22 subtracted from the sum of the positions of 76 and 80 will indicate the relative position of the two members of the follow-up valve 50. Thus, if this quantity is 0, the valve 50 will be set to hoist; if it is 1, the valve will be set in neutral or closed position; and if it is 2, the valve will be set to lower. The table indicates these values, together with numerical examples of the tension, which may be maintained on the cable 18 under these conditions.

| Operation | Tension | 80 | 76 | 22 | 80+76−22 |
|---|---|---|---|---|---|
| Idle | 0 | 3 | 1 | 3 | 1 |
| Lower light | 0 | 4 | 1 | 3 | 2 |
| Hoist light | 0 | 2 | 1 | 3 | 0 |
| Constant tension | 500 | 2 | 1 | 2 | 1 |
| Hoist loaded | 5000 | 0 | 1 | 1 | 0 |
| Stop loaded | 5000 | 0 | 2 | 1 | 1 |
| Lower loaded | 5000 | 0 | 3 | 1 | 2 |
| Set down | 500 | 0 | 3 | 2 | 1 |
| Lower light | 0 | 2 | 3 | 3 | 2 |
| Stop lowering | 0 | 2 | 2 | 3 | 1 |

The effect of other possible positions of the controls not indicated in the table may be easily determined by the same calculation of the sum of the positions of 76 and 80 minus the position of 22. While the three control members 22, 76 and 80 have for convenience been considered as movable between certain definite positions it will be understood that each may occupy any position whatever between the extreme positions and that the follow-up valve will be opened to a corresponding degree as soon as the motor speed picks up to the speed of movement of the pilot cable 58. Thus, it is possible by manual operation, in the case of controls 76 and 80, and automatically, in the case of the control 22, to produce any speed of the drum desired within the capacity of the hydraulic transmission. This is particularly apparent in the control 76 which operates as a proportional control; that is, the speed of operation of the drum is proportional to the displacement of the lever 76 away from position number 2, for example, when control 22 is at position number 1 and control 80 is at zero position.

It will be noted that the control 22 constitutes a force measuring element which is connected to the load and to the motive element by a differential connection. The position of the pulley 22 represents the algebraic sum of the movements of the hook 30 and the drum 16. Likewise, the follow-up valve 50 constitutes a controlling element, the effect of which on the motive element is differential with respect to the movements of the load and of the motive element.

It will be noted that during hoisting of the plane the follow-up valve 50 is wide open in the direction for winding in cable on the drum 16. Should a larger wave or a roll of the ship cause the plane to be again raised relative to the boom after hoisting has begun, the tension will be relieved on the cable and although the pulley 22 will move downwardly it can have no beneficial effect upon the follow-up valve since it is already fully open in hoisting position. Under these conditions change-over valve 44 acts to shift the hydraulic motor from operation on ten pinions to operation on two pinions and slack is prevented from occurring in cable 18. This is done preferably at a cable tension somewhat higher than the tension normally maintained while the plane is riding on the waves by the control pulley 22.

This result is insured by proper selection of the areas of the pistons 44 with regard to the fluid pressures produced by various cable tensions. Thus, if the valve is so constructed as to lift at 750 lbs. per sq. in. fluid pressure and to fall only when the pressure has dropped to 250 lbs. per sq. in., then it will be seen that the cable tension at which the valve 44 shifts to two pinion operation is one and two-thirds the cable tension at which the valve 44 changed over from two pinion to ten pinion operation, which latter value is preferably slightly above the normal tension maintained by follow-up valve 50 under the control of pulley 22.

At all times during operation of the hoist, the stroke and consequently the displacement of the pump is automatically regulated to correspond with the quantity of fluid required by the valve opening at follow-up valve 50. Thus, when the valve 50 is closed, the pressure is built up in line 104 to force the piston 114 to the right to move the tilting box 110 into no stroke position. As soon as fluid is required by a given opening of the valve 50, the spring 128 moves the piston 114 to the left until the stroke has been increased sufficiently to maintain a predetermined small pressure drop between conduit 104 and conduit 46, or 48, depending on the direction of operation of drum 16.

While the form of embodiment of the invention as herein disclosed, constitutes a preferred form, it is to be understood that other forms might be adopted, all coming within the scope of the claims which follow. It will also be understood that where the claims define an object subject to varying external forces counteracting the pull (of the device) that this and similar expressions refer to conditions not only where the external forces are acting in a direction opposite to the pull of the device on the object but also where the external forces may be, at least at times, of opposite sign and assisting the pull of the device.

What is claimed is as follows:

1. In a device for pulling on an object while subject to varying external forces counter-acting the pull, the combination of a winch, means for connecting the winch to the object, a motor for driving the winch, control means for the motor for causing the winch to either maintain a light predetermined tension on the connecting means, or to positively pull in the connecting means and means accessible at the object for operating said control means.

2. In a device for pulling on an abject while subject to varying external forces counter-acting the pull, the combination of a winch, means for connecting the winch to the object, a motor for driving the winch, control means for regulating the speed and direction of motion of the motor, and means including a pilot cable extending adjacent said connecting means, for operating said control means in response to relative movement between the pilot cable and the connecting means, said last means being ineffective on said control means whenever the pilot cable and the connecting means are moved concurrently.

3. In a device for pulling on an object while subject to varying external forces counter-acting the pull the combination of a winch, means for connecting the winch to the object, a motor for driving the winch, control means for regulating the speed and direction of motion of the motor, and means including a pilot cable extending to the object and having operative connection with said control means, said pilot cable and connecting means being arranged to control the motor in proportion to the algebraic sum of the movement of the object to be lifted relative to the winch and an additional movement imparted to the pilot cable at will.

4. In a device for pulling on an object while subject to varying external forces counter-acting the pull, the combination of a winch, means for connecting the winch to the object to be pulled, a first fluid motor means for driving the winch high speed and light load, a second fluid motor means for driving the winch at a lower speed and heavier load, a pump for supplying pressure fluid to said motor means, and valve means automatically responsive to the load on the winch for disconnecting the second fluid motor means from the pump when the load decreases below a predetermined value.

5. In a device for pulling on an object while subject to varying external forces counter-acting the pull, the combination of a winch, means for connecting the winch to the object to be pulled, a first fluid motor means for driving the winch at high speed and light load, a second fluid motor means for driving the winch at a lower speed and heavier load, a pump for supplying pressure fluid to said motor means and valve means automatically responsive to the load on the winch for connecting the second fluid motor means to the pump when the load increases beyond a predetermined value.

6. In a device for pulling on an object while subject to varying external forces counter-acting the pull, the combination of a winch, means for connecting the winch to the object to be pulled, a first fluid motor means for driving the winch at high speed and light load, a second fluid motor means for driving the winch at a lower speed and heavier load, a pump for supplying pressure fluid to said motor means and valve means automatically responsive to the load on the winch for connecting the second fluid motor means to the pump when the load increases beyond a predetermined value and for disconnecting the second fluid motor means from the pump when the load decreases below a predetermined value lower than the first value.

7. In a fluid power transmission system the combination of a pump, a fluid motor, a load device operatively connected to the motor, valve means for controlling the operation of the motor, said means comprising a first valve member, a second valve member operatively connected to the motor, means operatively connecting the first valve member to the load device, means including a lost-motion connection for connecting the motor to the load device, means for controlling said lost-motion connection in accordance with a physical value to be controlled, said valve being connected in said system in a manner to cause the motor to operate in accordance with relative movement between said members.

8. In a fluid power transmission the combination of a constant speed variable displacement pump, a fluid motor, conduits connecting the pump and the motor for operation of the latter by fluid entirely supplied by said pump, adjustable four-way reverse valve means in series in said conduits for controlling the flow of fluid between the pump and motor, and means responsive to the pressure drop across said valve means for regulating the displacement of the pump.

9. In a fluid power transmission the combination of a variable displacement pump, a fluid motor, a controlling element, conduits connecting the pump and the motor, valve means for controlling the flow of fluid between the pump and motor, said means comprising a first valve member operatively connected to said controlling element, a second valve member operatively connected to the motor, and means responsive to the pressure drop across said valve means for regulating the displacement of the pump.

10. In a device for lifting a floating object while subject to wave action the combination of a winch, a cable windable on said winch and connected with a hook for engagement with the object to be lifted, a hydraulic motor for driving the winch, a variable displacement pump for driving the motor, a follow-up valve connected between the pump and the motor and having one member connected to rotate with the motor and a second member mounted for limited rotation relative to the first member, a pilot drum connected to the second member, a pilot cable wound on the pilot drum and having its outer end associated with the hook for limited movement relative thereto, a yielding lost-motion connection in the operating connections between the hook and the motor, means for manually controlling the position of the pilot cable relative to the hook, and additional manually operable means for changing the relative positions of the first valve member and the second valve member whereby the operation of the motor may be controlled at times independently of the position of the pilot cable relative to the hook.

11. In a cable winding winch operating system the combination of a winch drum, a fluid motor operatively connected to the drum, a variable displacement fluid pump, fluid supply and return conduits connecting the pump and motor, a follow-up valve for controlling said conduits, said valve comprising a first member movable in accordance with movements of the drum and a second member movable over a limited range relative to the first member and means for imparting to said second member motion corresponding to that desired for the hoist drum.

12. In a cable winding winch operating system the combination of a winch drum, a fluid motor operatively connected to the drum, a variable displacement fluid pump, fluid supply and return conduits connecting the pump and motor, a follow-up valve for controlling said conduits, said valve comprising a first member movable in accordance with movements of the drum, a second member movable over a limited range relative to the first member means for imparting to said second member motion corresponding to that desired for the hoist drum, and means for varying the pump displacement in accordance with the pressure drop across the follow-up valve.

13. In a fluid power transmission system the combination of a pump, a fluid motor, a load device, operative connections between the motor and the load device, valve means for controlling the operation of the motor, said means comprising a first valve member, a second valve member operative connections between the first valve member and the load device, operative connections between the second valve member and the motor, a lost-motion device forming part of one of said connections, means for controlling said lost-motion device in accordance with a physical value to be controlled, and fluid connections for causing the motor to operate in accordance with relative movement between said members.

14. In a device for lifting a floating object while subject to wave action the combination of a winch, a cable windable on said winch and connected with a hook for engagement with the object to be lifted, a hydraulic motor for driving the winch, a variable displacement pump for driving the motor, a follow-up valve connected between the pump and the motor and having one member connected to rotate with the motor and a second member mounted for limited rotation relative to the first member, a pilot drum connected to the second member, a pilot cable wound on the pilot drum and having its outer end associated with the hook for limited movement relative thereto, a yielding lost-motion connection in the operating connections between the hook and the motor, and means for manually controlling the position of the pilot cable relative to the hook.

15. In a device for pulling on an object subject to varying external forces counteracting the pull, the combination of a winch, a pulling cable for connecting the winch to the object, a pilot cable having a portion movable with the object, a motor for driving the winch, and means for controlling the motor, said means including a device which is responsive to relative motion between the pilot cable and the pulling cable and nonresponsive to concurrent motion of said cables.

16. In a device for pulling on an object subject to varying external forces counteracting the pull, the combination of a winch, a pulling cable for connecting the winch to the object, a pilot cable extending adjacent the pulling cable, a motor for driving the winch, follow-up control means for controlling the motor, and means operatively connecting the pilot cable to the follow-up control means.

17. In a device for pulling on an object subject to varying external forces counteracting the pull, the combination of a winch, a pulling cable for connecting the winch to the object, a pilot cable extending adjacent the pulling cable, a fluid motor for driving the winch, follow-up control means for controlling the motor, and means operatively connecting the pilot cable to the follow-up control means.

18. In a device for pulling on an object subject to varying external forces counteracting the pull, the combination of a winch, a pulling cable for connecting the winch to the object, a pilot cable extending adjacent the pulling cable, a fluid motor for driving the winch, a follow-up valve for controlling the motor, and means operatively connecting the pilot cable to the follow-up valve.

19. In a fluid power transmission the combination of a variable displacement pump, a fluid motor, conduits connecting the pump and the motor for operation of the latter by fluid entirely supplied by said pump, adjustable four-way reverse valve means for controlling the flow of fluid between the pump and motor, and means responsive to the pressure drop across said valve means for regulating the displacement of the pump, said means including oppositely acting piston means subjecting respectively to fluid pressure from the pump side of the valve and from the motor side of the valve.

20. In a fluid power transmission the combination of a variable displacement pump, a fluid motor, a controlling element, conduits connecting the pump and the motor, valve means for controlling the flow of fluid between the pump and motor, said means comprising a first valve member operatively connected to said controlling element, a second valve member operatively connected to the motor, and means responsive to the pressure drop across said valve means for regulating the displacement of the pump, said means including oppositely acting piston means subject respectively to fluid pressure from the pump side of the valve and from the motor side of the valve.

21. In a device for pulling on an object while subject to varying external forces counteracting the pull the combination of a winch, means for connecting the winch to the object, a motor for driving the winch, control means for regulating the speed and direction of motion of the motor, and means including a pilot cable effective to operate said control means and having a portion operable by relative motion between the object and the winch and means for varying the effect of said pilot cable on said control means at will.

22. In a device for pulling on an object subject to varying external forces counteracting the pull the combination of a winch having a main drum and a pilot drum, variable speed motive means for operating the main drum, a main cable and a pilot cable wound on said respective drums and each having a portion movable with the object, means forming a yielding lost motion connection between the object and the motive means and control means for the motive means operable differentially from the motive means and the pilot drum.

23. In a device for pulling on an object subject to varying external forces counteracting the pull the combination of a variable speed motive means, connecting means between the motive means and the object for pulling on the object, a pilot connecting means having a portion connected with the object, a yielding lost motion device forming part of one of said connecting means, and a control device for the motive means operable differentially from two of said means.

24. In a device for pulling on an object subject to varying external forces counteracting the pull, the combination of a winch, a pulling cable for connecting the winch to the object, a pilot cable having a portion arranged to partake of movement corresponding to the movement of the object, a motor for driving the winch, follow-up control means for controlling the motor, and means operatively connecting the pilot cable to the follow-up control means.

25. In a device for pulling on a load element subject to varying external forces counteracting the pull the combination of a variable speed motive element, a control element operable to control the speed of the motive means, a force measuring element operable to deflect a predetermined amount when a predetermined pull is exerted on the load element, and operative connections between said four elements, said control element and said force measuring element each being connected for differential action with respect to the motion of two of the other elements.

26. In a device for pulling on a load element subject to varying external forces counteracting the pull the combination of a variable speed motive element, a control element operable to control the speed of the motive means, a force measuring element operable to deflect a predetermined amount when a predetermined pull is exerted on the load element, a manually operable element, and operative connections between said five elements, said control element, said force measuring element, and said manually operable element, each being connected for differential action with respect to the motion of two of the other elements.

27. In a fluid power transmission system the combination of a constant speed variable displacement pump, a fluid motor, supply and return conduits connecting the pump and motor for operation of the latter by fluid entirely supplied by said pump, adjustable valve means in said conduits for selectively reversing and for variably throttling the flow in at least one of the conduits and forming the normal means for regulating the speed and direction of operation of the motor, and means responsive to the pressure drop produced by throttling at said valve means for regulating the displacement of the pump.

28. In a cable winding winch operating system the combination of a winch drum, a fluid motor operatively connected to the drum, a variable displacement fluid pump, fluid supply and return conduits connecting the pump and motor, a follow-up valve for controlling said conduits, said valve comprising a first member directly connected to and movable with the drum and a second member movable over a limited range relative to the first member and means for imparting to said second member motion corresponding to that desired for the winch drum.

THOMAS B. DOE.
EDWIN L. ROSE.